United States Patent
Ovsiannikov

(10) Patent No.: US 7,813,545 B2
(45) Date of Patent: Oct. 12, 2010

(54) BACKLIT SUBJECT DETECTION IN AN IMAGE

(75) Inventor: Ilia Ovsiannikov, Studio City, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 1077 days.

(21) Appl. No.: 11/513,570

(22) Filed: Aug. 31, 2006

(65) Prior Publication Data

US 2008/0056705 A1    Mar. 6, 2008

(51) Int. Cl.
G06K 9/00 (2006.01)
G06K 9/40 (2006.01)
H04N 5/232 (2006.01)

(52) U.S. Cl. ............... 382/164; 382/274; 382/167; 348/364

(58) Field of Classification Search ............... 382/274
See application file for complete search history.

(56) References Cited

U.S. PATENT DOCUMENTS

| | | | |
|---|---|---|---|
| 4,423,936 A | | 1/1984 | Johnson |
| 5,742,659 A | * | 4/1998 | Atac et al. ............ 378/98.8 |
| 5,881,171 A | * | 3/1999 | Kinjo ............ 382/199 |
| 6,101,273 A | * | 8/2000 | Matama ............ 382/169 |
| 6,122,076 A | * | 9/2000 | Shiota ............ 358/447 |
| 6,931,208 B2 | | 8/2005 | Nakata et al. |
| 7,006,692 B2 | | 2/2006 | Matsushima |
| 7,010,160 B1 | | 3/2006 | Yoshida |
| 7,015,968 B2 | | 3/2006 | Ong et al. |
| 7,023,481 B1 | | 4/2006 | Wantanabe et al. |
| 7,092,625 B2 | | 8/2006 | Nonaka |
| 7,349,574 B1 | * | 3/2008 | Sodini et al. ............ 382/168 |
| 7,570,840 B2 | * | 8/2009 | Imai ............ 382/286 |

\* cited by examiner

*Primary Examiner*—Bhavesh M Mehta
*Assistant Examiner*—Hadi Akhavannik
(74) *Attorney, Agent, or Firm*—Kramer Levin Naftalis & Frankel LLP

(57) ABSTRACT

An image window is subdivided into a plurality of sub-windows arranged in a rectangular grid pattern. The average brightness of the window and each sub-window is determined. A sub-window is tagged as dark if its average brightness is a predetermined percentage of the window average brightness. If the sub-window in the center of the grid pattern is considered to be dark, a segmentation is performed to detect a main backlit subject. The comparison of sub-window brightness is continued from the center sub-window in outward sequential, side adjacent rows and columns of sub-windows. Each sub-window that meets the above-described criterion for being dark is tagged as dark. The image is considered to have a main backlit subject if, in one embodiment, the subject is comprised of a predetermined quantity of continuous, dark sub-windows.

1 Claim, 5 Drawing Sheets

|     | I →   |     |     |     |     |
| --- | ----- | --- | --- | --- | --- |
|     | 1,1   | 2,1 | 3,1 | 4,1 | 5,1 |
| J ↓ | 1,2   | 2,2 | 3,2 | 4,2 | 5,2 |
|     | 1,3   | 2,3 | 3,3 | 4,3 | 5,3 |
|     | 1,4   | 2,4 | 3,4 | 4,4 | 5,4 |
|     | 1,5   | 2,5 | 3,5 | 4,5 | 5,5 |

FIG. 2

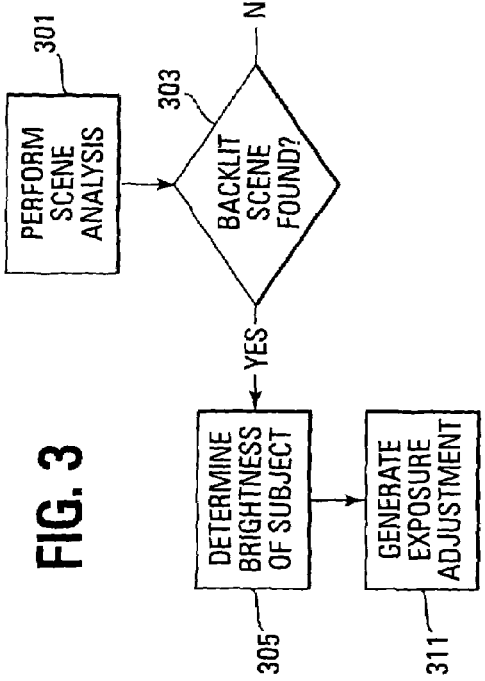

BACKLIT SUBJECT DETECTION IN AN IMAGE

TECHNICAL FIELD OF THE INVENTION

The embodiments of the present invention relate generally to optical devices and in particular to semiconductor image sensors.

BACKGROUND OF THE INVENTION

Image sensors are used in many different types of electronic devices to capture an image. For example, consumer devices such as video cameras and digital cameras as well as numerous scientific applications use image sensors to capture an image. An image sensor is comprised of photosensitive elements that collect light that hits it and produces an electrical signal indicative of that light. Each photosensitive element is typically referred to as a picture element or pixel.

A backlit scene is a scene in which the main subject is imaged against a background that is substantially brighter than the main subject. This type of scene can cause problems for cameras in attempting to generate exposure settings for the camera. The camera typically sets the exposure in response to the bright background while underexposing the subject. This causes the main subject to turn out darker than normally desired.

Some cameras provide a backlit subject mode that enables the photographer to select whether the main subject is backlit. Such a setting requires that the photographer be knowledgeable in backlighting, recognize when it occurs, and manually select the backlit mode. Since a large number of photographers are amateurs, they either do not recognize a backlit subject situation or forget to manually set the backlighting mode. For the reasons stated above, and for other reasons stated below which will become apparent to those skilled in the art upon reading and understanding the present specification, there is a need in the art for detecting subject backlighting in a solid-state sensor.

BRIEF DESCRIPTION OF THE DRAWINGS

FIG. 2 shows one embodiment of an image window with a plurality of sub-windows.

FIG. 3 shows a flowchart of one embodiment of a method for detecting a backlit subject in an image.

FIG. 5 shows a flowchart of one embodiment of a method for detecting a continuous, dark subject in an image.

DETAILED DESCRIPTION

Figure 1:
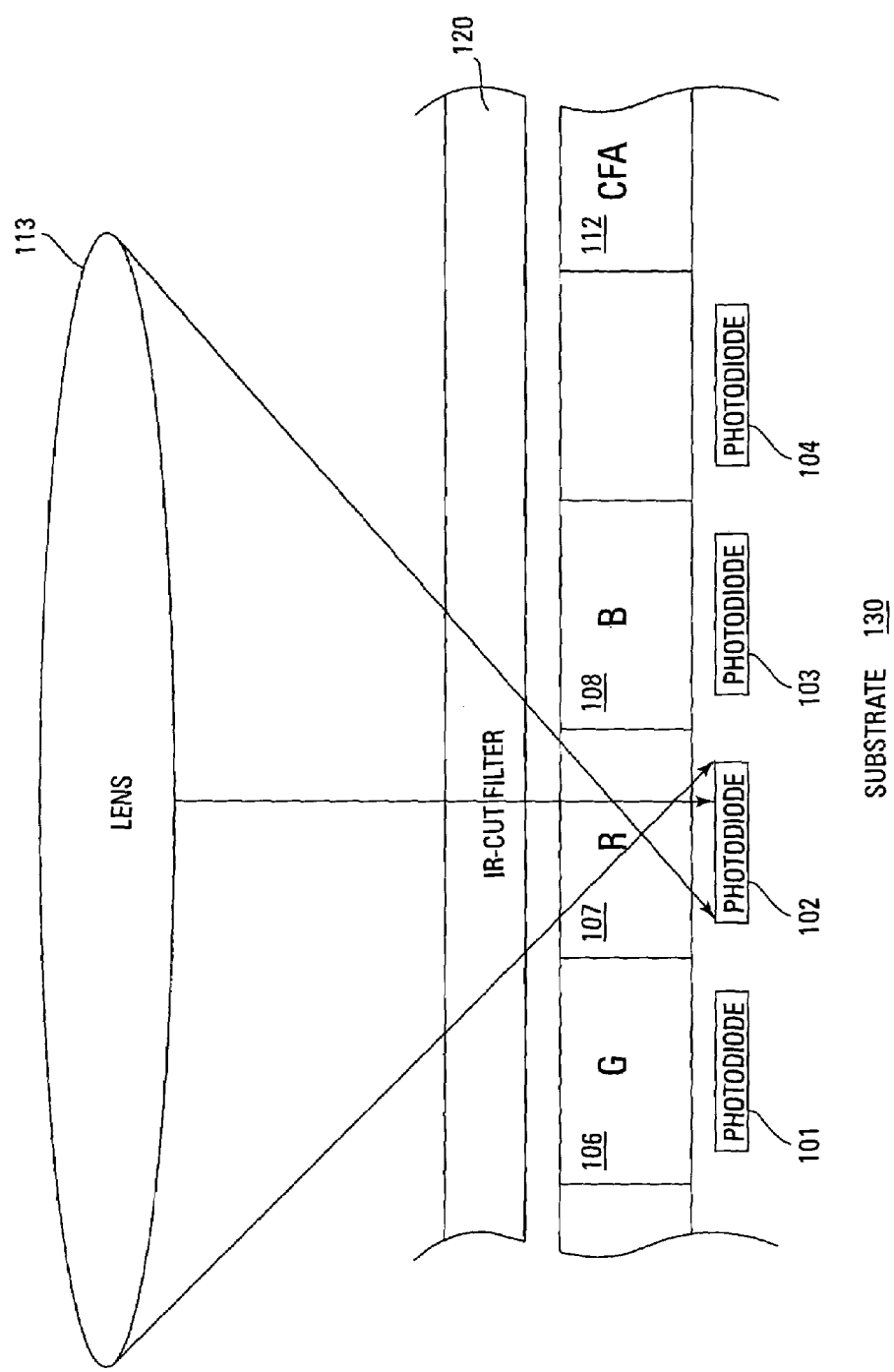
FIG. 1 shows a cross-sectional view of one embodiment of a portion of an image sensor.

In the following detailed description, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates a cross-sectional view of one embodiment of an image sensor. For purposes of clarity, not all of the layers are shown in this figure. For example, there may be metal interconnect layers formed between the layers shown as well as dielectric layers for insulation purposes.

The sensor is comprised of a substrate 130 that incorporates a plurality of pixels or photodiodes 101-104. The photodiodes 101-104 are responsible for converting light into an electrical light signal for use by the circuitry that reads the photodiode information. The higher the intensity of the light that strikes the photodiode 101-104, the greater the charge collected and the greater the magnitude of the light signal read from the photodiode.

In one embodiment, a color filter array (CFA) 112 can be formed over the photodiodes 101-104. This optional layer comprises the different color filters required for the color system that is used. For example, the filters may be red 107, green 106, and blue 108 for an additive RGB system or cyan, yellow, magenta, and an extra green for a subtractive CYMG system. Each filter color separates out that particular color for that photodiode. In one embodiment, the color filters are formed in a "Bayer" color filter pattern over the photodiodes. Alternate embodiments can use other patterns. One embodiment can use a grayscale sensor.

A lens 113 can be positioned over the CFA 112. The lens 113 is responsible for focusing light on the photodiodes 101-104. An infrared-cut filter 120 is placed in front of the sensor. The infrared-cut filter 120 blocks out infrared light invisible to the human eye to enable a correct color reproduction.

FIG. 2 illustrates an image window that is subdivided into a plurality of sub-windows. The embodiment illustrated uses a grid size of 5×5 sub-windows. Each sub-window is uniquely identified and labeled with its i,j coordinates that are used by any system controller responsible for determining and storing the status of each sub-window as described in the following embodiments.

The grid size of the image window of FIG. 2 is for purposes of illustration only. Alternate embodiments may use other quantities and sizes of sub-windows in order to accomplish the backlight detection embodiments disclosed herein.

FIG. 3 illustrates one embodiment of a method for backlight detection in an image. A scene analysis is performed 301 to determine if there is a main, central backlit subject in the image 303. One embodiment for determining the existence, size, location, and brightness of a subject is illustrated in FIGS. 4A-4D and FIG. 5 that are discussed subsequently. If there is not a backlit scene found 303, no further exposure compensation is required 307.

The backlight detection algorithm typically works with an automatic auto-exposure module and provides it with information about the scene. The information includes scene brightness Bs and a signal indicating whether backlit condition was identified Fb. If there is not a backlit scene found 303, no further exposure compensation is required. The scene backlight identification module provides auto-exposure a value of Fb="false" and $Bs=L_{AVG}$ as described subsequently. The auto-exposure would then generate appropriate exposure settings.

For example, the auto-exposure may choose the exposure setting for scene brightness to a desired image brightness target value. For instance, the desired target value could be 18% gray for images taken under moderate illumination to produce a mid-key photograph. Bright scenes, such as sunny outdoor photography, could use a target value of more than 18% to produce a photograph that is high-key to convey the feel of bright ambiance that was present when the image was taken. Low-light photography would use a target of less than 18% gray to produce low-key images.

Using Bs, auto-exposure may take other information into consideration. Auto-exposure may also generate settings to control other camera functions in order to achieve a pleasing looking photograph. For example, auto-exposure can control image tonal correction and the camera flash.

If there is a main backlit subject 303, the scene backlight detection module returns Fb="true" and Bs=$L_{avg\ main\ subj}$ where:

$$L_{AVG\ main\ subj} = \frac{\sum_{i,j=1}^{n} L_{AVGi,j}}{\sum_{i,j=1}^{n} m_{i,j}} \quad (1)$$

$$m_{i,j} = \begin{cases} 1 & \text{if } BL_{i,j} = \text{true} \\ 0 & \text{otherwise} \end{cases} \quad (2)$$

where $L_{AVG\ main\ subj}$ is the average luma of the main subject being backlit. Auto-exposure will then attempt to match Bs to the desired image brightness value.

The brightness of the subject in comparison to the background 305 is then determined. To accomplish this, a backlight threshold is generated. In one embodiment, the subject is considered to be backlit if the average luma of the corresponding window is at most one third of the average luma of the whole window. Alternate embodiments may use other thresholds. An exposure adjustment is generated 311 in response to the comparison of the subject and background brightness.

In order to detect a backlight condition and calculate the scene brightness, a sequence of steps is performed that includes calculation of brightness of each sub-window, thresholding the determined brightness, and performing image segmentation to identify a backlit main subject. To calculate brightness of each sub-window, the average luminance, $I_{AVG\ i,j}$, is collected for each sub-window of FIG. 2. In one embodiment, this is accomplished by reading the light signals from all of the pixels in each sub-window and determining the average of the magnitudes of the signals.

In RGB color sensors, the pixel outputs should be demosaiced and color corrected. Thereafter, luminance of each pixel is determined as a weighted sum of RGB color components as prescribed by the color space being used. For example, for sRGB space pixel luminance is found from linear RGB values I=0.212*R+0.7152*G+0.0722*B.

The average luminance is then converted to an average luma, $L_{AVG}$, by applying, in one embodiment, a $\log_2$ function to convert luminance to a more perceptually linear encoding. Luma is a non-linear function of luminance to approximate the non-linear subjective perception of brightness of the human eye. The luma conversion can be illustrated as:

$$L_{AVG\ i,j} = \log_2(I_{AVG\ i,j}) \quad (3)$$

where i,j=1, 2, ... 5. In an alternate embodiment, $L_{AVG\ i,j}$ for each sub-window is calculated as an average of $\log_2(I_{i,j})$ where $I_{i,j}$ is the luminance of pixel i,j.

The average luma for each sub-window is compared to the average luma of the image. Sub-windows that are substantially darker than the average luma of the image are "tagged" as possibly being part of a backlit subject. This can be expressed as:

$$L_{AVG} = \frac{\sum_{i,j=1}^{n} L_{AVGi,j}}{n^2} \quad (4)$$

where $$D_{i,j} = \begin{cases} \text{true} & \text{when } L_{AVGi,j}/L_{AVG} < k \\ \text{false} & \text{when } L_{AVGi,j}/L_{AVG} \geq k, \; i,j = 1...n \end{cases} \quad (5)$$

where $L_{AVG}$ is the average luma of the window, $L_{AVG\ i,j}$ is the average luma of each sub-window, $D_{i,j}$ is the indicator or tag for each sub-window that indicates that the sub-window is dark, k is the brightness threshold (e.g., ⅓) below which a sub-window is considered to be dark, and n is the grid size (e.g., n=5 for a 5×5 grid).

The "tag" or indication for each "dark" sub-window is a digital indication, stored by the software program in a memory location associated with a particular sub-window, to indicate the status of each sub-window in the image. For example, a tag in memory might be a single data bit that is a logic "0" for a dark sub-window and a logic "1" for a non-dark sub-window. Alternate embodiments can use other forms of tagging or indicating.

The above-described methods for calculating and comparing average luma and luminance are for purposes of illustration only. Alternate embodiments may use other methods for determining these values. For example, k can be altered to control the rate of correct backlight scene identification cases versus false positive occurrences.

Sub-window tags, $D_{I,J}$, are analyzed with respect to their two-dimensional configuration. In one embodiment, the configuration is appropriate to cases where a large dark subject is positioned in the center of the image. As illustrated in FIGS. 4A-4D, the image is segmented, starting from the center sub-window, in order to detect a continuous shape that consists of all dark squares. If the center sub-window is considered to be dark, the comparison of sub-window brightness is continued from the center sub-window in outward sequential, side adjacent rows and columns of sub-windows. Each sub-window that meets the above-described criterion for being dark is tagged as dark. The image is considered to have a main backlit subject if, in one embodiment, the subject is comprised of a predetermined quantity of continuous, dark sub-windows.

In one embodiment, the center sub-window must be part of the continuous, dark subject. This reduces the likelihood that the continuous dark squares are not part of the subject such as when they are off to the side of the image. In such an embodiment, the image can be locked in the center of the sensor by an input from the photographer such as partially depressing the shutter button. This permits the present embodiments to determine whether the subject is backlit while allowing the photographer to move the subject to another location of the image.

Referring to the image of FIGS. 4A-4D and the flowchart of the method of FIG. 5, the center sub-window 400 is reviewed to determine if it is dark (i.e., $D_{I,J}$="true") 501. Suppose all $BL_{i,j}$="false" before segmentation begins. If the center window is dark, $D_{3,3}$ is "false". If $D_{3,3}$ is "false" 503, the method stops 505 since this indicates that the scene might not be backlit. If $D_{i,j}$ is "true", the sub-window is tagged (e.g., $BL_{i,j}$="true") as part of the main backlit subject 504.

Figure 4A:
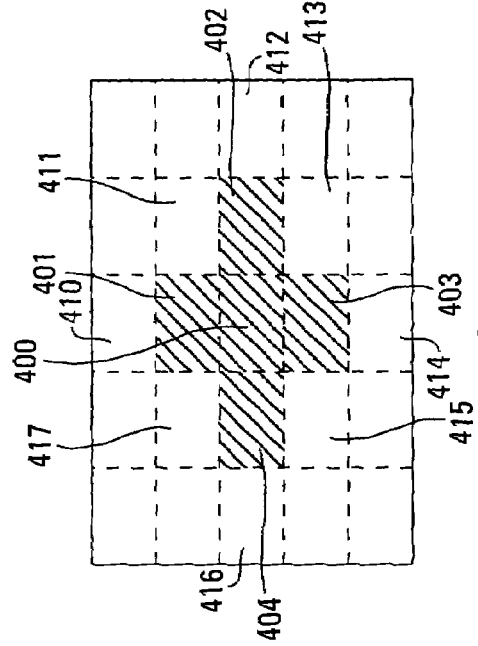
FIGS. 4A-4D show one embodiment for determining a backlit subject in accordance with the embodiment of FIGS. 2 and 3.
Figure 4B:
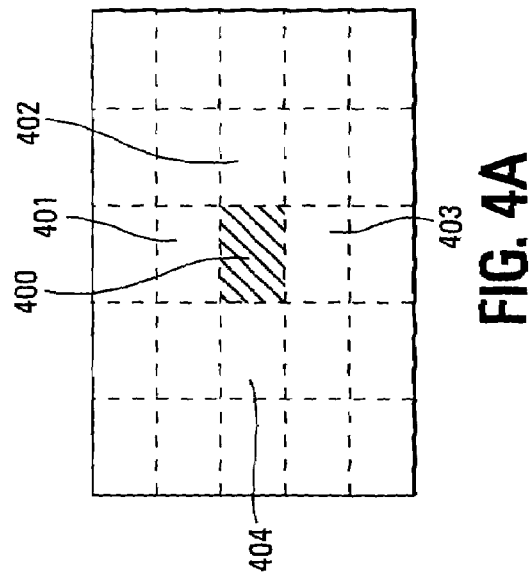

The sub-windows 401-404 that are immediately adjacent to the center BL-tagged square 400 are then reviewed 507. In this embodiment, only the sub-windows that border on the sides of the center sub-window 400, and not the corners, are reviewed. If the side adjacent sub-windows are considered dark as discussed previously 507, these sub-windows 401-404 are tagged (e.g., $BL_{i,j}$="true") as part of the main backlit subject 509 as shown in FIG. 4B.

When all dark sub-windows adjacent to BL-tagged sub-windows have been considered 507, the entire subject has been tagged 511. If the subject is comprised of a predetermined quantity of continuous, dark sub-windows, it is considered a backlit subject. One embodiment of rules for checking the size of the subject is discussed subsequently.

Referring again to FIG. 4B, the next side adjacent sub-windows 410-417 are checked as to whether they meet the darkness criterion. If they are considered dark and are not BL-tagged 507, they are BL-tagged 509 in memory. This is illustrated in FIG. 4C.

Figure 4C:
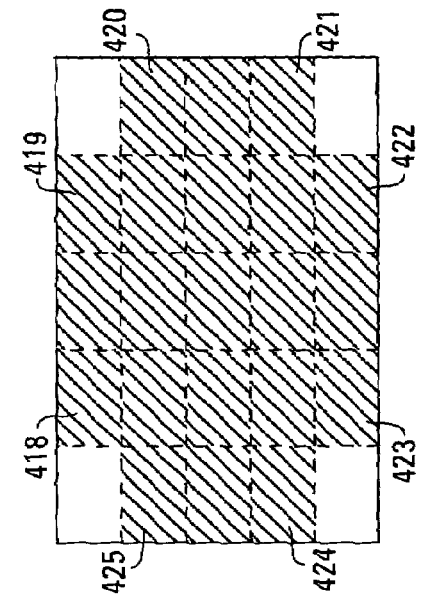
Figure 4D:
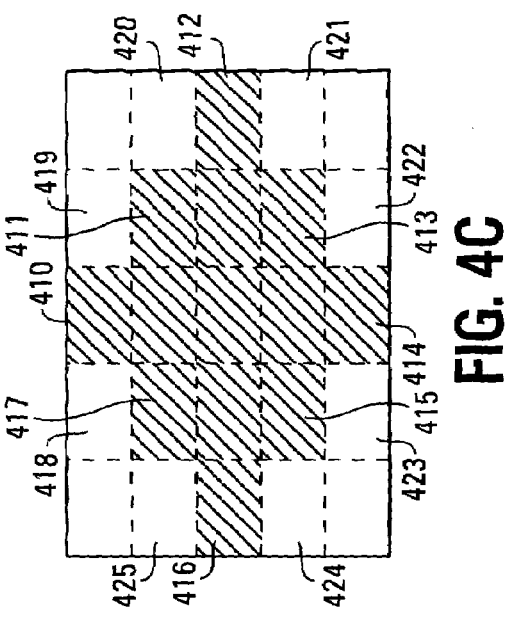

FIG. 4C also shows the next group of side adjacent sub-windows 418-425 to be considered 507. If these sub-windows meet the criteria for being dark, they are BL-tagged 509 in memory as shown in FIG. 4D.

It can be seen from FIGS. 4A-4D that the segmentation method is horizontally and vertically symmetrical. Thus the backlight detection embodiments operate properly regardless of the camera's image sensor orientation (i.e., 0°, 90°, 180°, or 270°) when taking a picture.

To complete identification of the backlit situation, it is determined that the size of the main backlit subject is sufficiently large. The size of the backlit subject can be verified with predetermined subject size criteria. For example, if the sub-windows (i.e., i,j=2,2; 2,3; 2,4; 3,2; 3,4; 4,2; 4,3, 4,4) in the center of the image, including the center sub-window (i.e., i,j=3,3) should have at least four or more dark squares. Sub-windows on the periphery of the image (i.e., i,j=1,1 . . . 1,5; 5,1 . . . 5,5; 2,1 . . . 4,1; and 2,5 . . . 4,5) should have at least three or more dark squares.

The described embodiments are not limited to these rules for determining the existence and size of the backlit subject. Alternate embodiments can use other rules.

Figure 6:
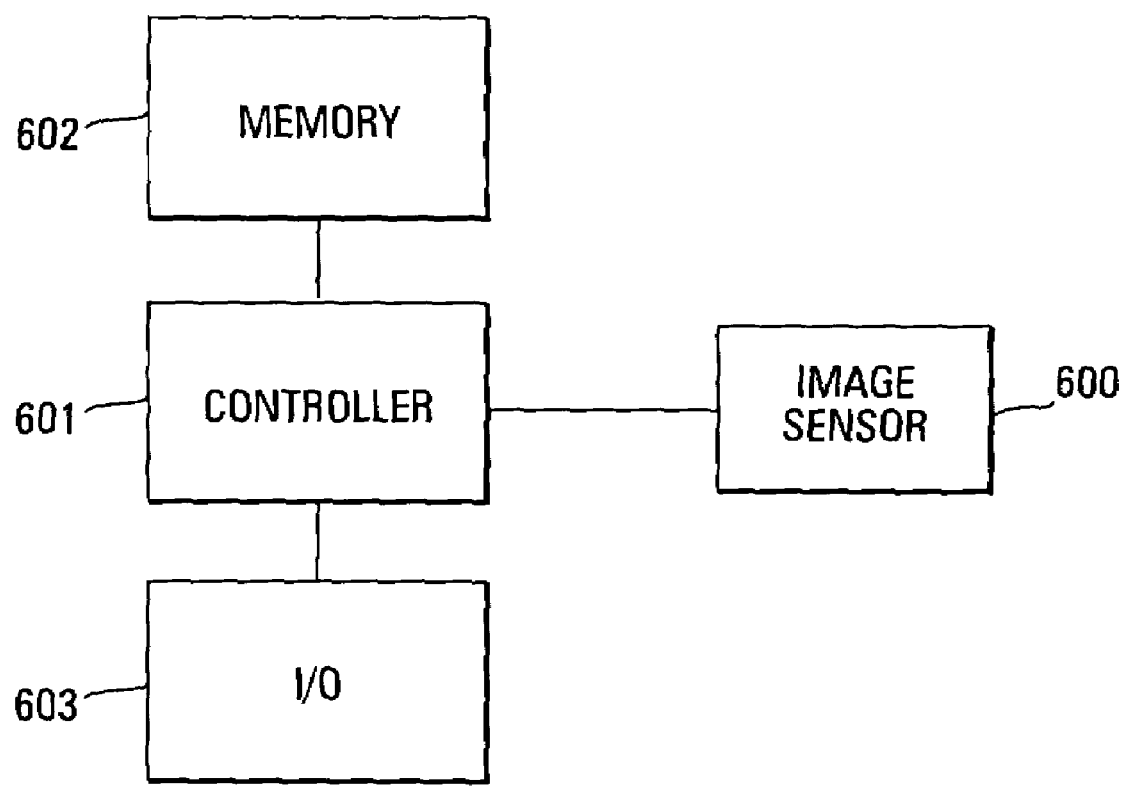
FIG. 6 shows a block diagram of one embodiment of an imaging system of the present invention.

FIG. 6 illustrates a block diagram of one embodiment of an imaging system of the present invention. The system comprises an image sensor 600 as described previously, coupled to a control circuit 601. This system can represent a camera or some other imaging device.

In one embodiment, the control circuit 601 is a processor, microprocessor, or other controller circuitry that reads and processes the image from the image sensor device 600. For example, the imaging system can be a digital camera in which the image sensor device 600 is exposed to an image for recording. The control circuitry 601 executes the above-described embodiments and reads the accumulated charges from the photodiodes of the image sensor device 600. The control circuitry 601 can then process the image using the above-described methods and tag the image. The tag data and the image can be stored in memory 602. The memory 602 can include volatile memory such as RAM and/or non-volatile memory such as flash memory. The memory 602 can also include non-semiconductor type memory such as disk drives.

The data from the system can be output to other systems over an I/O circuit 603. The I/O circuit 603 may be a Universal Serial Bus (USB) or some other type of bus that can connect the imaging system to a computer or other system.

CONCLUSION

In summary, the embodiments discussed herein provide a way to detect a backlit subject in an image such as an image that can be read from a semiconductor image sensor. This is accomplished by detecting the average brightness, expressed in luma, of an image window then determining if a predetermined quantity of continuous, dark sub-windows exists within the window. In one embodiment, a dark sub-window is defined as having an average brightness or luma that is a predetermined amount less than or a predetermined fraction or percentage of the average luma of the window.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for determining a backlit subject in an image received by a plurality of pixels of a semiconductor sensor array, the method comprising:

generating a window over the image, the window comprising a plurality of sub-windows arranged in a grid pattern;

performing a scene analysis on the window to determine a set of sub-windows that comprise the image and a location of the set of sub-windows within the grid pattern;

comparing an average brightness of each of the set of sub-windows to an average brightness of the window;

generating an indication that a first sub-window is dark when the average brightness of the first sub-window is a predetermined amount less than the average brightness of the window;

checking the average brightness of the first sub-window that is central to the grid pattern;

if the first sub-window is dark, checking the average brightness of a first adjacent set of sub-windows, each sub-window of the first adjacent set being adjacent to a different side of the first sub-window;

if a first predetermined quantity of the first adjacent set of sub-windows is dark, checking the average brightness of a second adjacent set of sub-windows, each sub-window of the second adjacent set being adjacent to a different side of the first adjacent set of sub-windows;

if a second predetermined quantity of the second adjacent set of sub-windows is dark, checking the average brightness of a third adjacent set of sub-windows, each sub-window of the third adjacent set being adjacent to a different side of the first adjacent set of sub-windows; and if a third predetermined quantity of each of the first, second, and third adjacent sets of sub-windows are dark, indicating the location of the backlit subject as being central to the grid pattern.

* * * * *